(12) United States Patent
De Smet et al.

(10) Patent No.: US 9,036,686 B2
(45) Date of Patent: May 19, 2015

(54) SYSTEM AND METHOD FOR INITIATING 3GPP MODEM ONLINE DATA STATES

(71) Applicant: Nvidia Corporation, Santa Clara, CA (US)

(72) Inventors: Bruno De Smet, Valbonne (FR); Flavien Delorme, Vence (FR); Fabien Besson, Auribeau-sur-Siagne (FR)

(73) Assignee: NVIDIA CORPORATION, Santa Clara, CA (US)

( * ) Notice: Subject to any disclaimer, the term of this patent is extended or adjusted under 35 U.S.C. 154(b) by 182 days.

(21) Appl. No.: 13/629,062

(22) Filed: Sep. 27, 2012

(65) Prior Publication Data

US 2014/0086288 A1 Mar. 27, 2014

(51) Int. Cl.
*H04B 1/38* (2006.01)
*H04L 5/16* (2006.01)

(52) U.S. Cl.
CPC .......................................... *H04B 1/38* (2013.01)

(58) Field of Classification Search
CPC ........................... H04W 64/00; H04M 1/72527
USPC .......... 375/222, 225, 354, 365; 370/254, 329; 455/466
See application file for complete search history.

(56) References Cited

U.S. PATENT DOCUMENTS

| 5,636,282 A | * | 6/1997 | Holmquist et al. | 726/16 |
| 5,654,983 A | * | 8/1997 | Sauser, Jr. | 375/225 |
| 5,878,277 A | * | 3/1999 | Ohta | 710/37 |
| 6,038,222 A | * | 3/2000 | Osler et al. | 370/282 |

FOREIGN PATENT DOCUMENTS

WO WO 0231671 A2 * 4/2002

OTHER PUBLICATIONS

3GPP TS 27.007 (3GPP TS 27.007, "3er Generation Partnership Project; Technical Specification Group Core Network and Terminals; AT command set for User Equipment (UE)", Release 10, Jun. 2011, total of 258 pages).*

* cited by examiner

*Primary Examiner* — Sam K Ahn
*Assistant Examiner* — Fabricio R Murillo Garcia

(57) ABSTRACT

A modem and a method of placing a modem in an online data state. In one embodiment, the modem includes: (1) a digital interface configured to receive, via an AT channel thereof, a standard AT command directing an AT channel of the modem to exit a command state and enter an online data state and (2) a command processor coupled to the digital interface and configured to: extract channel designation data received as a standard parameter of the standard AT command, cause a channel designated by the channel designation data and separate from the AT channel to enter the online data state, and allow the AT channel to remain in the command state.

10 Claims, 2 Drawing Sheets

SYSTEM AND METHOD FOR INITIATING 3GPP MODEM ONLINE DATA STATES

TECHNICAL FIELD

This application is directed, in general, to mobile telecommunications devices and, more specifically, to a system and method for initiating online data states in modems of mobile telecommunications devices.

BACKGROUND

As those skilled in the pertinent art are aware, six telecommunications standard development organizations have joined forces to create the Third Generation Partnership Project (3GPP). The 3GPP in turn has defined standards, called Technical Specifications (TSs), such as Long-Term Evolution (LTE) and Evolved Packet Core (EPC), that act as technology evolution paths for transforming disparate wireless telecommunication standards over time into a single, unified worldwide system for mobile devices, such as smartphones. Consequently, a wide range of powerful mobile telecommunications devices is beginning to appear in the market and gain rapid acceptance.

3GPP wireless devices employ modulation/demodulation circuits, commonly called "modems," to communicate over wireless carrier frequencies. As sophisticated as these modems are, however, they still use so-called "Attention" or simply "AT" commands, which have been used for decades and employed to control some of the first modems ever developed. Of course, the AT command sets employed with respect to modern modems are far more sophisticated and feature-laden than in the early days, but the general structure of the AT command remains the same: a string of characters beginning with "AT" and followed by other characters specifying the type of AT command and various parameters that may be associated with the type of AT command.

3GPP modems support a command channel, also called an "AT channel," capable of assuming a command state in which the AT channel is configured to receive AT commands or an online data state in which the AT channel is configured to bear traffic to be communicated wirelessly, e.g., to another modem, in the context of a data connection. According to 3GPP, +CGDATA and D AT commands defined in 3GPP TS 27.007 are employed to command the AT channel to exit the command state and enter the online data state to establish a data connection.

SUMMARY

One aspect provides a modem. In one embodiment, the modem includes: (1) a digital interface configured to receive, via an AT channel thereof, a standard AT command directing an AT channel of the modem to exit a command state and enter an online data state and (2) a command processor coupled to the digital interface and configured to: extract channel designation data received as a standard parameter of the standard AT command, cause a channel designated by the channel designation data and separate from the AT channel to enter the online data state, and allow the AT channel to remain in the command state.

Another aspect provides a method of placing a modem in an online data state. In one embodiment, the method includes: (1) receiving a standard AT command designed to direct an AT channel of the modem to exit a command state and enter an online data state, (2) extracting channel designation data from a standard parameter of the standard AT command and (3) causing a channel designated by the channel designation data and separate from the AT channel to enter the online data state in lieu of the AT channel, the AT channel therefore remaining in the command state.

Yet another aspect provides a 3GPP modem. In one embodiment, the 3GPP modem includes: (1) a digital interface configured to receive, via an AT channel thereof, a standard 3GPP AT command directing an AT channel of the modem to exit a V.250 command state and enter a V.250 online data state and (2) a command processor coupled to the digital interface and configured to: (2a) extract channel designation data received as a standard parameter of the standard 3GPP AT command, (2b) cause a channel designated by the channel designation data and separate from the AT channel to enter the V.250 online data state, and (2c) allow the AT channel to remain in the V.250 command state.

BRIEF DESCRIPTION

Reference is now made to the following descriptions taken in conjunction with the accompanying drawings, in which.

DETAILED DESCRIPTION

As stated above, 3GPP TS 27.007 defines +CGDATA and D AT commands to command the AT channel to exit the command state and enter the online data state. However, according to TS 27.007 sections 10.1.12 and 10.2.1, the command and online data states are to be mutually exclusive. More specifically, upon entering the V.250 online data state, these sections mandate that the AT channel should not process any further AT command until the commanded data connection is terminated.

It is realized herein, however, that this mandated operation, while straightforward to implement, is actually disadvantageous in that it frustrates continuing use of the AT channel for the purpose of controlling the modem. TS 27.007 particularly prevents the AT channel from being used as a dedicated control channel. TS 27.007 also prevents other channels from being used as dedicated data channels.

It is further realized herein that an opportunity exists to remain compliant with TS 27.007 yet provide a modem with a persistent, dedicated control channel and perhaps one or more dedicated data channels. It is specifically realized herein that TS 27.007 sections 10.1.12 and 10.2.1 allow TE to define and employ a proprietary protocol to be used between the TE and a mobile terminal (MT) of an MS that contains the modem. In fact, sections 10.1.12 and 10.2.1 define for the +CGDATA and D AT commands a standard parameter that can contain a proprietary protocol. The proprietary protocol is embodied as a character string in the standard parameter.

It is thus fundamentally realized that a proprietary protocol may be provided that directs the modem to establish a data connection using a channel other than the AT channel and thereby allow the AT channel to remain in the command state.

In various embodiments, the protocol calls for the incorporation of channel designation data in the standard parameter. The channel designation data may then be extracted and employed to cause a channel designated by the channel designation data and separate from the AT channel to enter an online data state in lieu of the AT channel, thereby allowing the AT channel to remain in the command state and potentially operate as a persistent, dedicated command channel.

Figure 1:
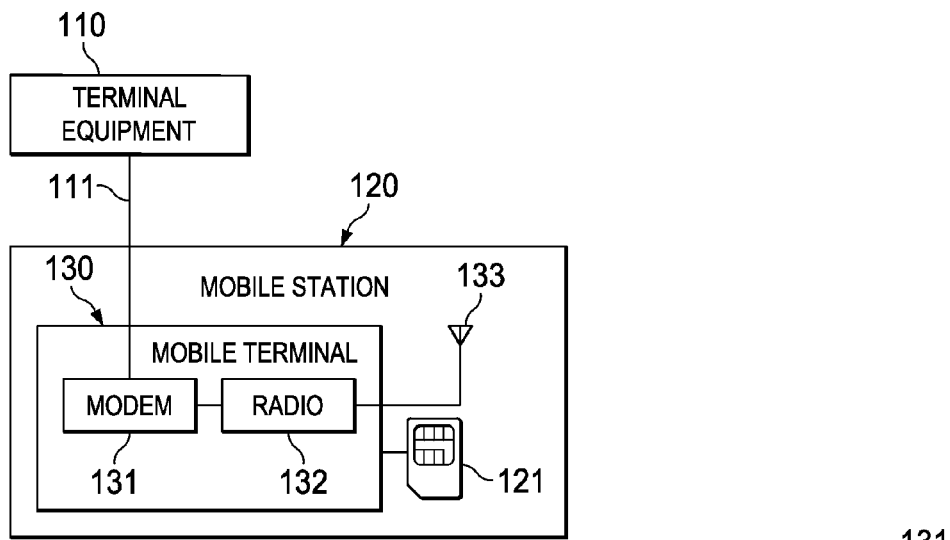
FIG. 1 is a block diagram of terminal equipment (TE) and a mobile station (MS) forming an environment in which the system or method can operate.

Having generally described various realizations leading to a novel modem and a method, various embodiments of the novel modem and method will now be described. Accordingly, FIG. 1 is a block diagram of TE 110 and an MS 120 forming an environment in which the system or method can operate.

The TE 110 may also be known as a "host" or "application processor." The TE 110 is generally configured to provide telecommunications services to a user using the MS 120. A terminal adapter (TA) 111 couples the TE 110 to the MS 120. The TA may also be known as an AT port and is configured to support multiple channels. In various configurations, one of the multiple channels is designated as an AT channel, and one or more other of the multiple channels are designated as data channels.

The MS 120 includes an MT 130 and a Subscriber Information Module (SIM) card 121. The MT 130 may also be known as mobile equipment (ME). The MT 130 is generally configured to respond to AT commands to initiate and terminate data connections to effect the communication of data (e.g., voice, video or computer data) over a wireless telecommunications network.

The MT 130 includes a modem 131 and a radio 132. The modem 131 is generally configured to transform digital data into symbols that the radio 132 uses to generate a transmission. The modem 131 is also generally configured to transform symbols provided by the radio 132 into digital data for use by the TE 110. The radio 132 is generally configured to modulate a carrier wave with symbols provided by the modem 131 to yield a radio-frequency (RF) signal and transmit the RF signal wirelessly using an antenna 133. The radio 132 is further configured to receive and demodulate an RF signal using the carrier wave to yield symbols for use by the modem 131.

The SIM card 121 is a storage device generally configured to contain data (e.g., configuration or identification) data particular to a subscriber and perhaps software that the TE 110 may employ to carry out various functions. In the illustrated embodiment, the SIM card 121 contains computer instructions that allow the TE 110 to employ the proprietary protocol described herein. Further, the illustrated embodiment of the modem 131 is configured to interpret the proprietary protocol to initiate online data states in accordance with the teachings herein.

Figure 2:
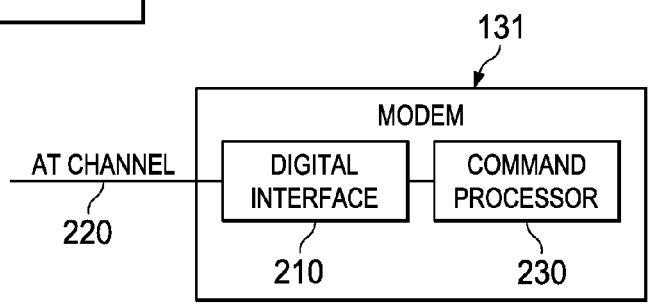
FIG. 2 is a block diagram of one embodiment of a modem.

FIG. 2 is a block diagram of one embodiment of a modem, e.g., the modem 131 of FIG. 1. The modem 131 includes a digital interface 210 and a command processor 230 coupled to the digital interface 210.

In the illustrated embodiment, the digital interface 210 is configured to receive AT commands via an AT channel 220. In the illustrated embodiment, the AT channel 220 is borne on the TA 111, leading from the TE 110 of FIG. 1. The digital interface 210 is configured to receive a standard AT command directing an AT channel of the modem 131 to exit a command state and enter an online data state.

In the context of 3GPP, the standard AT command takes the form of a standard 3GPP AT command, i.e., a +CGDATA or D AT command, and the standard parameter is designed to contain a proprietary protocol, e.g., defined by the string 'M-xxxx' using the parameter <L2P>. In the illustrated embodiment, the string 'xxxx' defines the channel and therefore contains the channel designation data. With the principles described herein, the channel designation data designates a channel other than the AT channel.

The command processor 230 is coupled to the digital interface 210. In the illustrated embodiment, the command processor 230 is configured to extract the channel designation data that is received in the standard parameter of the standard AT command. In the illustrated embodiment, the command processor 230 is further configured then to cause a channel designated by the channel designation data and separate from the AT channel to enter the online data state. In the illustrated embodiment, the command processor 230 is yet further configured then to allow the AT channel to remain in the command state. In certain embodiments, the above measures taken by the command processor 230 are sufficient to cause the AT channel to function as a dedicated AT channel between the TE and the MT and further to cause the channel designated by the channel designation data to function as a dedicated data channel between the TE and the MT.

Figure 3:
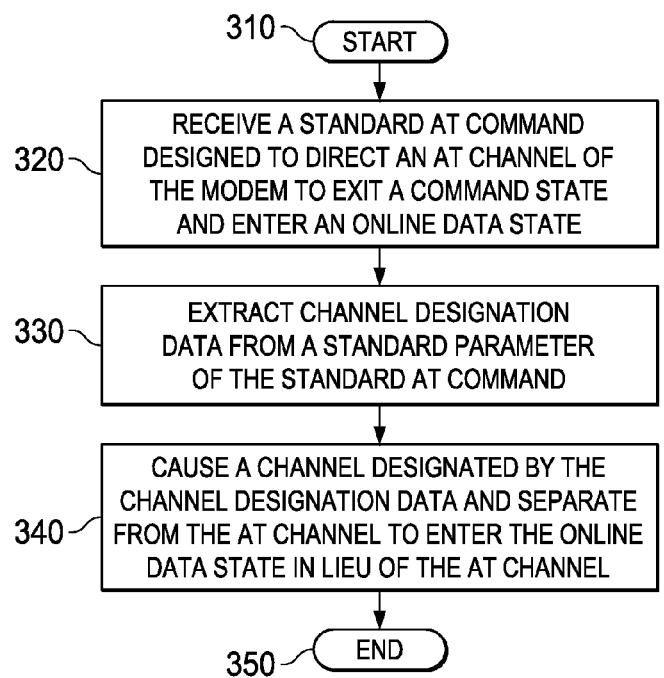
FIG. 3 is a flow diagram of one embodiment of a method of placing a modem in an online data state.

FIG. 3 is a flow diagram of one embodiment of a method of placing a modem in an online data state. The method begins in a start step 310. In a step 320, a standard AT command designed to direct an AT channel of the modem to exit a command state and enter an online data state is received. In a step 330, channel designation data is extracted from a standard parameter of the standard AT command. In a step 340, a channel designated by the channel designation data and separate from the AT channel is caused to enter the online data state in lieu of the AT channel. In one embodiment, the step 340 includes causing the AT channel to function as a dedicated AT channel between TE and the MT. The method ends in an end step 350.

Having described various embodiments of a modem and a method of placing a modem in an online data state, two examples will now be illustrated in which online data states are initiated in PPP and NDIS contexts. Those skilled in the pertinent art should understand, however, that other conventional or later-defined data link protocols may be appropriate for supporting an online data state. All such protocols fall within the broad scope of the invention.

Figure 4A:
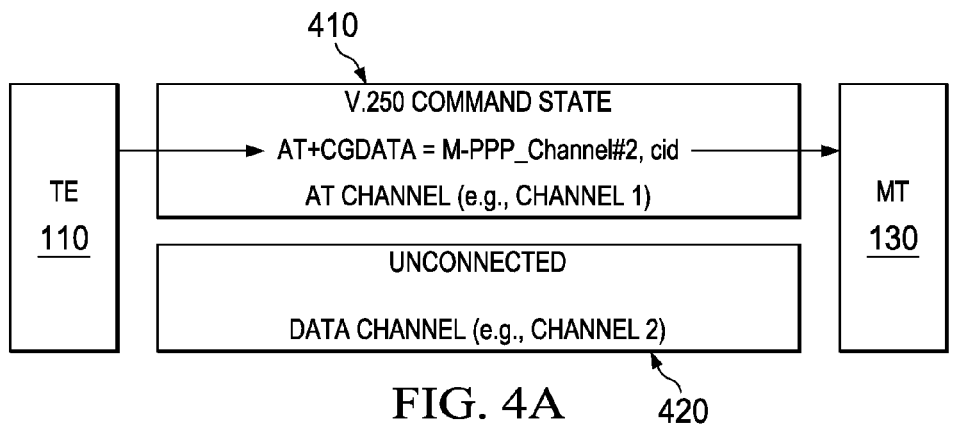
FIGS. 4A and 4B are diagrams of a first example in which a Point-to-Point Protocol (PPP) online data state is initiated in a modem.
Figure 4B:
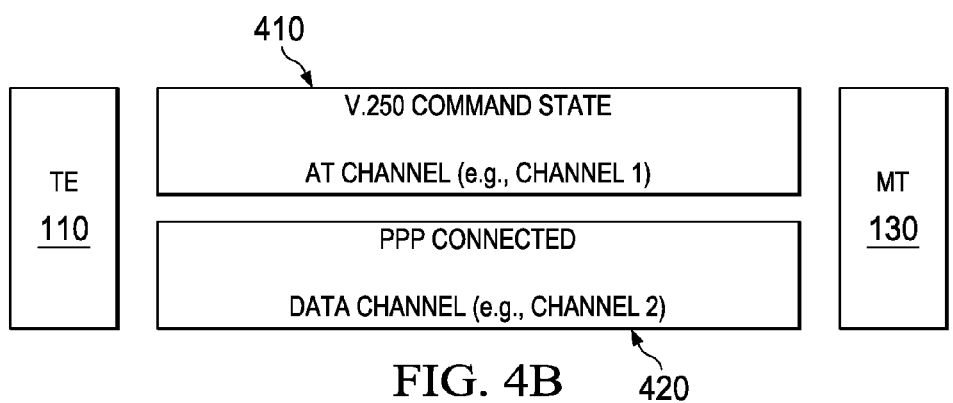

FIGS. 4A and 4B are diagrams of a first example in which a PPP online data state is initiated in a modem. Both FIGS. 4A and 4B show two modem channels (i.e., an AT channel 410 and a data channel 420) spanning the TE 110 and the MT 130. The AT channel may be, for example, channel 1, and the data channel 420 may be, for example, channel 2. FIG. 4A shows an initial state before an AT command is issued to cause a data connection to be initiated. FIG. 4B shows a subsequent state after the AT command is issued.

In FIG. 4A, the AT channel 410 is in a V.250 command state, and the data channel 420 is in an unconnected state. The TE 110 issues an AT command to cause a PPP data connection between the TE 110 and the MT 130 to be initiated. In the example of FIG. 4A, the AT command takes the form of a character string, namely 'AT+CGDATA=M-PPP_Channel#2, cid'. In this example, the string '2' constitutes the channel designation data. As stated above, the command processor (230 of FIG. 2) is configured to extract the channel designation data, cause the data channel 420 to enter the PPP online data state and allow the AT channel to remain in the command state. Accordingly, in FIG. 4B, the AT channel 410 remains in a V.250 command state, and the data channel 420 is in a PPP connected state. In their respective states, the AT channel 410 acts as a persistent, dedicated command channel, and the data channel 420 acts as a persistent, dedicated PPP data channel, between the TE 110 and the MT 130.

Figure 5A:
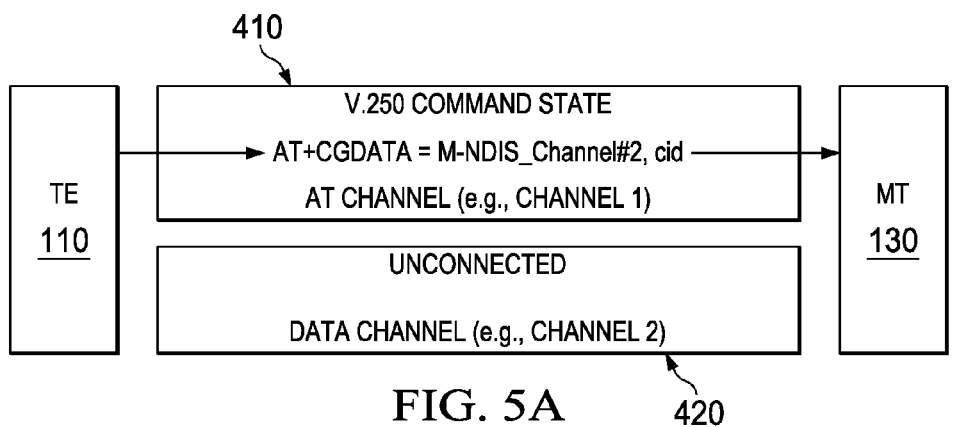
FIGS. 5A and 5B are diagrams of a second example in which a Network Driver Interface Specification (NDIS) online data state is initiated in a modem.
Figure 5B:
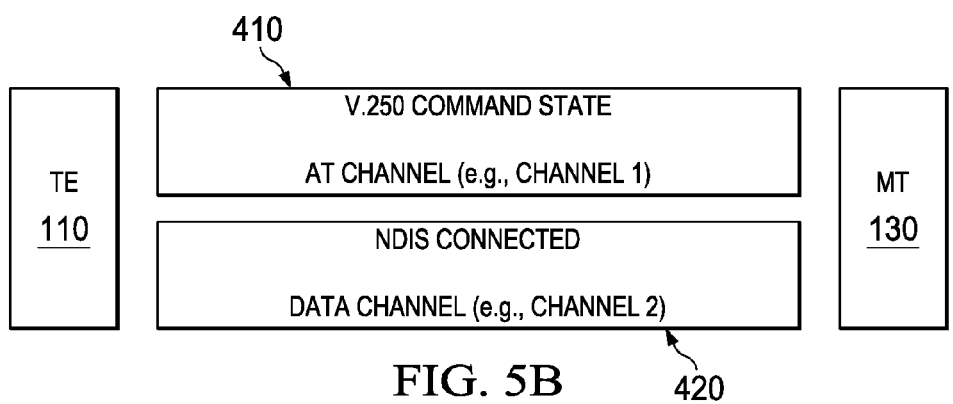

FIGS. 5A and 5B are diagrams of a second example in which an NDIS online data state is initiated in a modem. Both FIGS. 5A and 5B show two modem channels (i.e., an AT channel 410 and a data channel 420) spanning the TE 110 and the MT 130. The AT channel may be, for example, channel 1, and the data channel 420 may be, for example, channel 2. FIG. 5A shows an initial state before an AT command is issued to cause a data connection to be initiated. FIG. 5B shows a subsequent state after the AT command is issued.

In FIG. 5A, the AT channel 410 is in a V.250 command state, and the data channel 420 is in an unconnected state. The TE 110 issues an AT command to cause an NDIS data connection between the TE 110 and the MT 130 to be initiated. In the example of FIG. 5A, the AT command takes the form of a character string, namely 'AT+CGDATA=M-NDIS_Channel#2, cid'. As in the above example, the string '2' constitutes the channel designation data. As stated above, the command processor (230 of FIG. 2) is configured to extract the channel designation data, cause the data channel 420 to enter the NDIS online data state and allow the AT channel to remain in the command state. Accordingly, in FIG. 5B, the AT channel 410 remains in a V.250 command state, and the data channel 420 is in an NDIS connected state. In their respective states, the AT channel 410 acts as a persistent, dedicated command channel, and the data channel 420 acts as a persistent, dedicated NDIS data channel, between the TE 110 and the MT 130.

Those skilled in the art to which this application relates will appreciate that other and further additions, deletions, substitutions and modifications may be made to the described embodiments.

What is claimed is:

1. A modem, comprising:
   a digital interface configured to receive, via an Attention (AT) channel thereof, said AT channel being in a command state, a standard AT command wherein said AT command will direct one of a plurality of other channels to exit said command state and enter an online data state; and
   a command processor coupled to said digital interface and configured to:
      extract channel designation data received as a standard parameter of said standard AT command from said digital interface,
      cause said one of said plurality of other channels designated by said channel designation data and separate from said AT channel to enter said online data state to only transmit data, and
      allow said AT channel to remain in said command state.

2. The modem as recited in claim 1 wherein said standard parameter is configured to contain proprietary protocols.

3. The modem as recited in claim 1 wherein said modem is contained in a mobile terminal and said command processor is configured to cause said AT channel to function as a dedicated AT channel between terminal equipment and said mobile terminal.

4. The modem as recited in claim 1 wherein said digital interface is an AT port.

5. The modem as recited in claim 1 wherein said online data state is selected from the group consisting of:
   a Point-to-Point Protocol online data state, and
   a Network Driver Interface Specification online data state.

6. A method of placing a modem in an online data state, comprising:
   receiving a standard Attention (AT) command via an AT channel of said modem, said AT channel being in a command state, wherein said AT command will direct one of a plurality of other channels to exit said command state and enter an online data state;
   extracting channel designation data from a standard parameter of said standard AT command; and
   causing one of said plurality of other channels designated by said channel designation data and separate from said AT channel to enter said online data state to only transmit data, said AT channel remaining in said command state.

7. The method as recited in claim 6 wherein said standard parameter is configured to contain proprietary protocols.

8. The method as recited in claim 6 wherein said modem is contained in a mobile terminal and said causing further comprises causing said AT channel to function as a dedicated AT channel between terminal equipment and said mobile terminal.

9. The method as recited in claim 6 wherein said digital interface is an AT port.

10. The modem as recited in claim 6 wherein said online data state is selected from the group consisting of:
    a Point-to-Point Protocol online data state, and
    a Network Driver Interface Specification online data state.

* * * * *